Nov. 22, 1932.  W. F. HEROLD  1,888,801
CASTER
Filed April 30, 1929
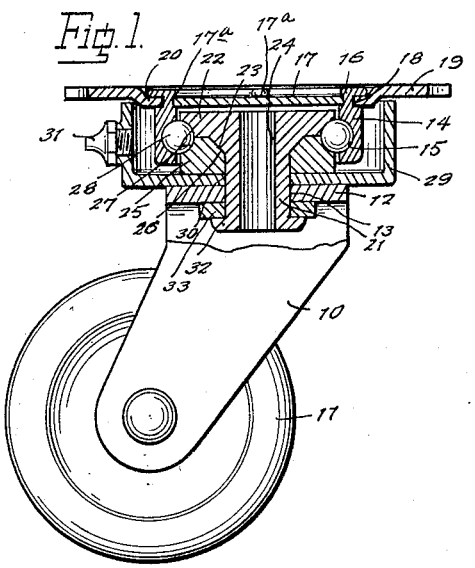
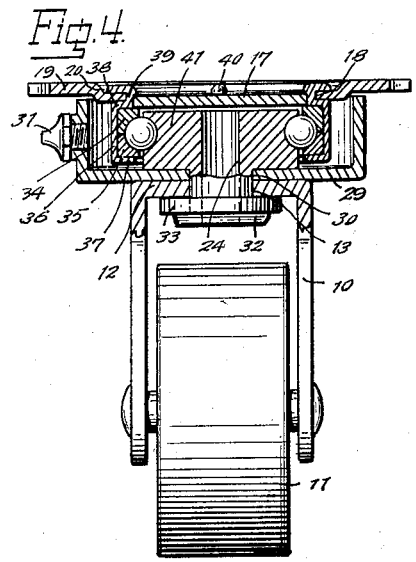
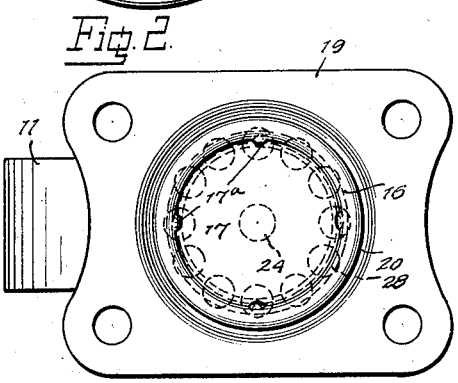
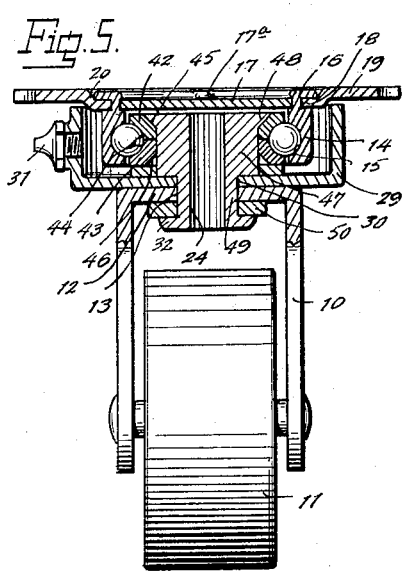
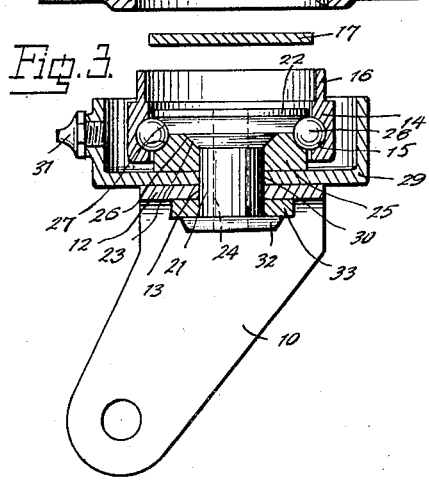
INVENTOR
WALTER F. HEROLD.
BY
ATTORNEY.

Patented Nov. 22, 1932

1,888,801

UNITED STATES PATENT OFFICE

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT

CASTER

Application filed April 30, 1929. Serial No. 359,199.

The present invention relates to improvements in casters, particularly of the ball-bearing type, and has for an object to provide a caster having a high degree of efficiency in use, and which at the same time will be relatively inexpensive and simple in construction.

It is particularly proposed to provide a caster in which the attaching means is in the form of a plate adapted for attachment to a flat surface, and it is an object of the invention to provide a construction in which such plate may be secured to the bearing unit independently of the assembly of the ball bearing unit and the caster horn. According to the invention the ball bearing unit is completely assembled independently of the attaching plate, so that its assembly does not depend upon any particular size or shape of the attaching plate, the latter being simply secured by connecting it to a portion of the bearing unit, as by bending or swaging one with respect to the other. A standardized bearing unit may thus be employed and a complete assortment of caster sizes and styles built around it, thereby greatly simplifying and economizing manufacture.

It is further proposed to provide a construction in which a plate having a central aperture is adapted to be secured by a continuous flange formed on the outer race element of the bearing unit and engaged in said aperture, so that such assembly is entirely independent of the assembly of the bearing unit and caster horn, and the bending or swaging of the flange may be accomplished without imposing strain or pressure on these parts.

A further object is to provide a relatively large lubricant reservoir which will not only effectively lubricate the bearing, but will completely protect it against the entrance of dirt and grit. It is also proposed to provide such a reservoir as a part of the unit assembly of the bearing.

With the above and other objects in view embodiments of the invention are shown in the accompanying drawing, and these embodiments will be hereinafter more fully described with reference thereto, and the invention will be finally pointed out in the claims.

In the drawing:—

Fig. 1 is a vertical sectional view, partly in side elevation, of a caster according to the present embodiment of the invention.

Fig. 2 is a plan view of the same.

Fig. 3 is a view showing the bearing unit in section, and before assembly, and the attaching plate and dust-cap in separated relation.

Fig. 4 is a vertical sectional view, partly in elevation, of a modified form of the invention.

Fig. 5 is a similar view of a further modified form.

Similar reference characters indicate corresponding parts throughout the several figures of the drawing.

Referring to the drawing, the caster comprises a horn 10, in which the wheel 11 is mounted, and provided in its upper flat portion 12 with an aperture 13. According to the present embodiment of the invention the ball-bearing unit, which constitutes a complete assembly independent of the horn and attaching plate, is adapted to have its inner rotatable ball-race member secured at its under side to the horn, the lubricant reservoir being secured between them, and its outer ball-race member secured at its upper side to the attaching plate and dust cap.

The ball-bearing unit comprises an outer ring 14, having a ball-race 15 of semi-circular cross-section, and at its upper surface, in spaced relation to its inner and outer peripheral edges, is provided with an upstanding flange 16, its inner circumference adapted to permit the dust cap plate 17 to fit therein and rest upon the ledge at the inner edge of the ring, while its outer circumference is adapted to engage within the aperture 18 of the attaching plate 19 the latter resting upon the ledge at the outer edge of the ring. The plate 19 is preferably dished, as at 20.

The inner member of the bearing comprises a center stud 21 having a laterally extending flange 22 at its upper end, and a beveled surface 23 between the under surface of the flange and the cylindrical surface of the stud. A central passage 24 preferably extends through the stud. A ring 25, having a beveled surface 26, is fitted upon the stud beneath the flange 22, and the ring and flange are grooved at their outer peripheral surface to provide a ball-race 27 of semi-circular cross-section. The balls 28 are interposed between the ball-races, being inserted before the assembly of the ring 25.

A flanged cup-shaped lubricant reservoir 29, having a central aperture 30 in its base, is adapted to be secured upon the stud beneath the ring 25 in such relation that it extends in spaced relation beneath the lower end of the outer race 14 and in outwardly spaced relation to its outer peripheral surface. A lubricant injection fitting 31 is secured in the side wall of the reservoir and is adapted to be engaged by a suitable grease gun.

The attachment plate 19 is first assembled to the outer ring by engaging the same about the flange 16, and bending the latter outwardly upon the plate, as shown in Fig. 1, to form a continuous retaining flange disposed within the dished portion 20, the projecting flat under surface of the ring providing a suitable support during this operation.

The ball-bearing unit is next assembled to the lubricant reservoir and the horn by engaging the stud 21 in the apertures 30 and 13 of the reservoir and horn, and heading it over, as at 32, a washer 33 being interposed between the bottom surfaces of the horn and the headed end 32. Before assembly of the cap 17, the top of the bearing unit is open, as shown in Fig. 3, so that the inner member of the bearing unit may be solidly supported during assembly of the lubricant reservoir and horn, and the heading over of the end 32.

Finally the dust cap plate 17 is assembled within the flange 16, being secured by swaging or pinching the metal inwardly at suitable points as at 17ª.

This sequence of assembly not only facilitates the assembly of the horn, lubricant reservoir, attaching plate and dust cap, but relieves the balls of any strain during the bending or swaging operations.

The lubricant reservoir is such that a relatively large quantity of lubricant may be forced therein so that the bearing is adequately lubricated, the relative movement of the outer race ring 14 within the reservoir causing the lubricant to be constantly agitated and fed into the ball-races. At the same time the reservoir effectually seals the bearing against the entrance of dirt and grit.

The passage 24 serves as a drain for plating solution, when the caster is plated in its assembled relation.

In Fig. 4 I have shown a modified form of the invention, in which the outer ring is made up of two half-sections 34 and 35, disposed within a cup member 36, flanged over at its lower edge, as at 37, and adapted to be flanged over at its upper edge, as at 38, to engage the upper side of the ring section 34 to secure the two rings together. The member is further bent upwardly, as at 39, inwardly of the inner periphery of the ring section 34, to provide a flange corresponding to the flange 16 of the first embodiment, this flange being bent outwardly upon the attaching plate 19, which is engaged about the flange 39 and rests upon the upper surface of the flange 38. The dust plate 17 which rests upon the ledge provided at the inner edge of the ring 34 is secured by pinching or peening over the metal of the flange 39, at suitable points, as at 40. In this embodiment I have shown an inner ball race member 41 having an external shape corresponding to the two-part inner ball race shown in Fig. 1, but formed of one piece, the two-part form of the outer race permitting the assembly of the balls.

In Fig. 5 I have shown another embodiment of the invention, in which a modified form of inner ball-race member is provided, the outer member being similar to that shown in Fig. 1. This inner member is formed of two similar half-section rings 42 and 43, grooved at their outer sides to provide a ball-race 44 of semi-circular cross-section, and beveled at their inner sides, as at 45 and 46. The two rings are assembled by means of a center stud 47, engaged within the openings of the rings and provided at its upper end with a beveled flange 48, seated upon the beveled surface 45 of the upper ring, the stud being provided at its lower end with a projecting post 49, for engagement in the aperture of the lubricant reservoir and horn, which are secured in the same manner as the first form. A washer 50 is interposed between the ring 43 and the lubricant reservoir, so that the latter will be spaced beneath the under surface of the outer ring 14.

It will be understood that either of the several forms of inner race forming members may be employed with any of the several forms of outer race forming members.

I have illustrated and described preferred and satisfactory embodiments of the invention, but it will be obvious that changes may be made therein, within the spirit and scope thereof, as defined in the appended claims.

Having thus described my invention what I claim and desire to secure by Letters Patent is:—

1. In a caster, a supporting element, an apertured attaching plate, and a ball-bearing assembly unit including relatively rotatable inner and outer ball-race members and anti-friction balls between them, means carried by said inner ball-race member adapted to be secured to said supporting element, and a flange carried by said outer ball-race member disposed in spaced relation to the inner and outer peripheries of said outer ball-race member to provide lateral ledges at the inner and outer edges of said member, said flange adapted to be engaged within said aperture of the attaching plate, and bent upon and securing said plate, and a dust closure plate secured within said flange, said attaching plate and said dust plate resting on said ledges at the respective outer and inner edges of said outer race member, said flange adapted to be bent upon and securing said dust plate.

2. In a caster, a supporting element, an apertured attaching plate, and a ball-bearing assembly unit including relatively rotatable inner and outer ball-race members and antifriction balls between them, said outer member consisting of upper and lower sections, each forming a portion of a ball-race, and a shell disposed about said sections and securing them in assembled relation, means carried by one of said rotatable members adapted to be secured to said supporting element, and a flange carried by said shell of the outer ball-race member engaged within said aperture of the attaching plate and bent upon and securing said plate.

3. In a caster, a horn member having an aperture in its upper portion, a caster wheel carried thereby, an attaching element, and a ball-bearing assembly unit including inner and outer relatively rotatable members and antifriction balls between them, a lubricant reservoir having a central aperture, a central downwardly extending stud carried by said inner rotatable member adapted to be engaged in said apertures of the lubricant reservoir and horn and secured thereto, and means carried by the outer rotatable member adapted to be secured to said attaching element.

4. In a caster, a supporting element including a horn having an aperture therein, a centrally apertured attaching plate, and a ball-bearing assembly unit including a pair of relatively rotatable members and antifriction balls between them, means for retaining said rotatable members and balls in assembled relation independently of said horn and attaching plate, assembling means carried by one of said rotatable members engaged and secured in said aperture of the horn, and assembling means carried by the other rotatable member engaged and secured in the aperture of said attaching plate.

5. In a caster, a supporting element including a horn having an aperture therein, an attaching element, a ball-bearing assembly unit including relatively rotatable inner and outer ball-race members and antifriction balls between them, assembling means carried by said inner ball-race member engaged and secured in said aperture of the horn, means carried by said outer ball-race member and secured to said attaching element, and lubricant reservoir means surrounding said ball-bearing assembly unit and secured between said inner ball-race member and said horn.

Signed at Bridgeport, in the county of Fairfield, and State of Connecticut, this 10th day of April, 1929.

WALTER F. HEROLD.